US006961446B2

(12) United States Patent
Imagawa et al.

(10) Patent No.: US 6,961,446 B2
(45) Date of Patent: Nov. 1, 2005

(54) METHOD AND DEVICE FOR MEDIA EDITING

(75) Inventors: Kazuyuki Imagawa, Fukuoka (JP); Yuji Takata, Fukuoka (JP); Hideaki Matsuo, Fukuoka (JP); Katsuhiro Iwasa, Izuka (JP); Tetsuya Yoshimura, Fukuoka (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 757 days.

(21) Appl. No.: 09/950,085

(22) Filed: Sep. 12, 2001

(65) Prior Publication Data

US 2002/0031262 A1 Mar. 14, 2002

(30) Foreign Application Priority Data

Sep. 12, 2000 (JP) .............................. 2000-275991

(51) Int. Cl.[7] .............................................. G06K 9/00
(52) U.S. Cl. .................. 382/103; 348/14.1; 348/14.15; 348/169; 382/107; 382/118; 382/173; 382/190; 382/309; 715/723
(58) Field of Search .......................... 348/14.01, 14.02, 348/14.03, 14.07, 142.17, 14.11, 397.1, 699, 348/700; 375/240.08, 240.16, 240.24; 379/93.17, 379/93.23, 142.06, 142.16, 142.17; 382/107, 382/218, 236, 243, 312, 190, 309; 386/52; 706/13; 715/716, 719, 723

(56) References Cited

U.S. PATENT DOCUMENTS

| | | | | |
|---|---|---|---|---|
| 5,500,671 A | * | 3/1996 | Andersson et al. | ......... 348/14.1 |
| 5,864,630 A | * | 1/1999 | Cosatto et al. | ............... 382/103 |
| 5,907,604 A | * | 5/1999 | Hsu | ...................... 379/142.06 |
| 5,999,207 A | * | 12/1999 | Rodriguez et al. | ....... 348/14.03 |
| 6,064,436 A | * | 5/2000 | Okada | .................... 375/240.16 |
| 6,215,890 B1 | * | 4/2001 | Matsuo et al. | ............... 382/103 |
| 6,356,339 B1 | * | 3/2002 | Enomoto | ..................... 355/40 |

(Continued)

FOREIGN PATENT DOCUMENTS

JP 5-91407 4/1993

(Continued)

OTHER PUBLICATIONS

Kiyotake Yachi, Toshikazu Wada and Takashi Matsuyama, "Human Head Tracking Using Adaptive Appearance Models With a Fixed-Viewpoint Pan-Tilt-Zoom Camera", MIRU2000, Meeting on Image Recognition and Understanding, pp. 9–14.

(Continued)

Primary Examiner—Bhavesh M. Mehta
Assistant Examiner—Gregory M. Desire
(74) Attorney, Agent, or Firm—Wenderoth, Lind & Ponack, L.L.P.

(57) ABSTRACT

The present media editing device generates media including messages in an easy manner in a communication terminal such as a mobile terminal. Therein, a moving image data storage part stores moving image data recorded by a user. A region extraction part extracts any region including the user from the moving image data. A front determination part detects whether or not the user in the extracted region is facing the front. A sound detection part detects the presence or absence of a sound signal of a predetermined level or higher. A frame selection part determines starting and ending frames based on the results outputted from the front determination part and the sound detection part. An editing part performs, for example, an image conversion process by clipping out the media based on thus determined starting and ending frames. A transmission data storage part stores the resultantly edited media as transmission data.

21 Claims, 16 Drawing Sheets

U.S. PATENT DOCUMENTS

| | | | |
|---|---|---|---|
| 6,363,160 B1 * | 3/2002 | Bradski et al. | 382/103 |
| 6,546,052 B1 * | 4/2003 | Maeda et al. | 375/240.08 |
| 6,556,775 B1 * | 4/2003 | Shimada | 386/121 |
| 6,573,908 B1 * | 6/2003 | Jang | 715/723 |
| 6,577,807 B1 * | 6/2003 | Yaegashi et al. | 386/52 |
| 6,594,375 B1 * | 7/2003 | Kato et al. | 382/107 |
| 6,611,613 B1 * | 8/2003 | Kang et al. | 382/118 |
| 6,636,635 B2 * | 10/2003 | Matsugu | 382/218 |
| 6,661,448 B2 * | 12/2003 | Lunden | 348/14.02 |
| 6,697,503 B2 * | 2/2004 | Matsuo et al. | 382/118 |
| 6,704,029 B1 * | 3/2004 | Ikeda et al. | 715/723 |
| 6,704,433 B2 * | 3/2004 | Matsuo et al. | 382/103 |
| 6,714,216 B2 * | 3/2004 | Abe | 715/723 |
| 6,724,417 B1 * | 4/2004 | Hillis et al. | 348/14.16 |
| 6,754,389 B1 * | 6/2004 | Dimitrova et al. | 382/224 |
| 6,784,899 B1 * | 8/2004 | Barrus et al. | 715/717 |
| 6,804,396 B2 * | 10/2004 | Higaki et al. | 382/181 |

FOREIGN PATENT DOCUMENTS

| | | |
|---|---|---|
| JP | 6-161131 | 6/1993 |
| JP | 6-343146 | 12/1994 |
| JP | 9-294239 | 11/1997 |

OTHER PUBLICATIONS

Atsushi Matsuo, Naruatu Baba, Tsukasa Noma, Hideaki Matsuo and Toshiaki Ejima, "Head Classifier: A Real-Time Face Classification System", 7th Symposium on Sensing Via Image Information, pp. 411-416.

Osamu Yamaguchi and Kazuhiro Fukui, "'Smartface'—A Robust Face Recognition System Under Varying Facial Pose and Expression", Publication of The Electronic Information Communications Society, vol. J84-D-II, No. 6, Jun. 2001, pp. 1045-1052.

* cited by examiner

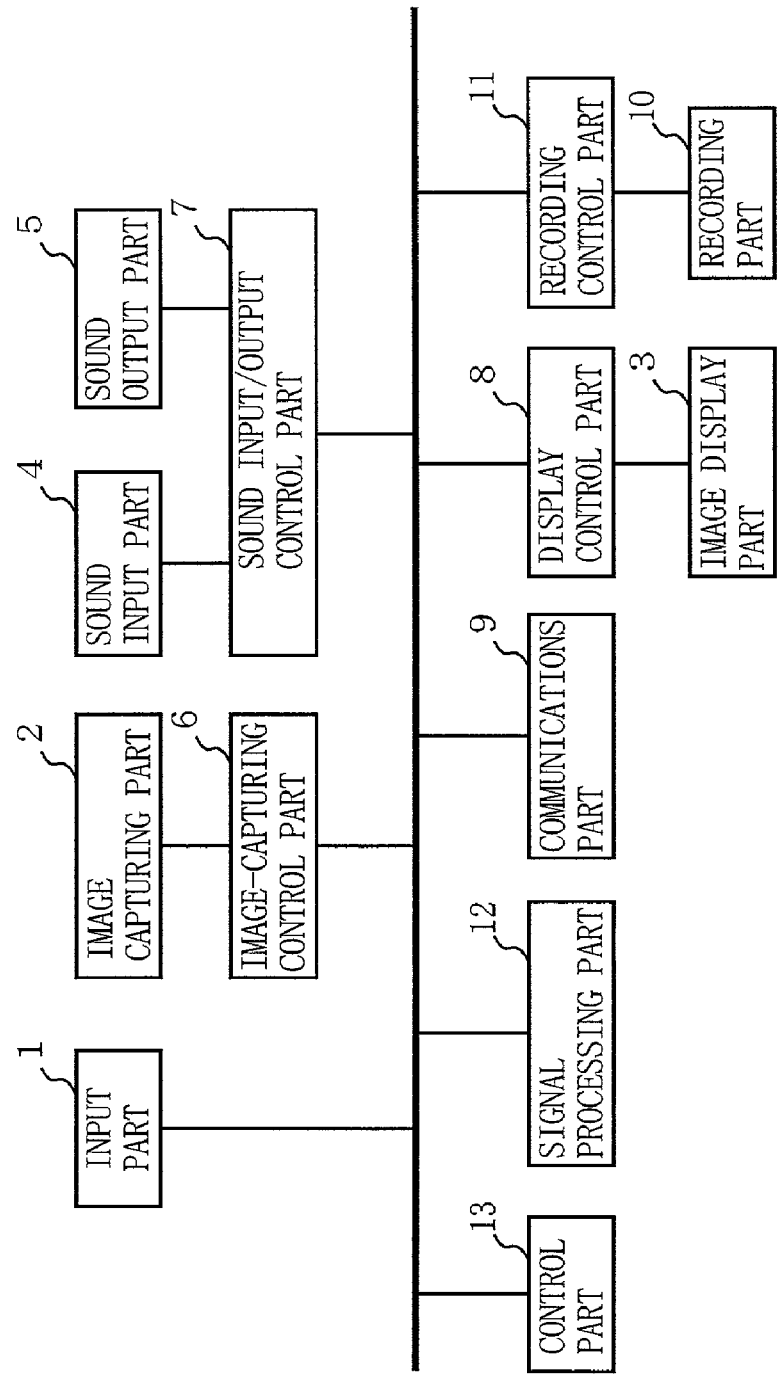

F I G. 3
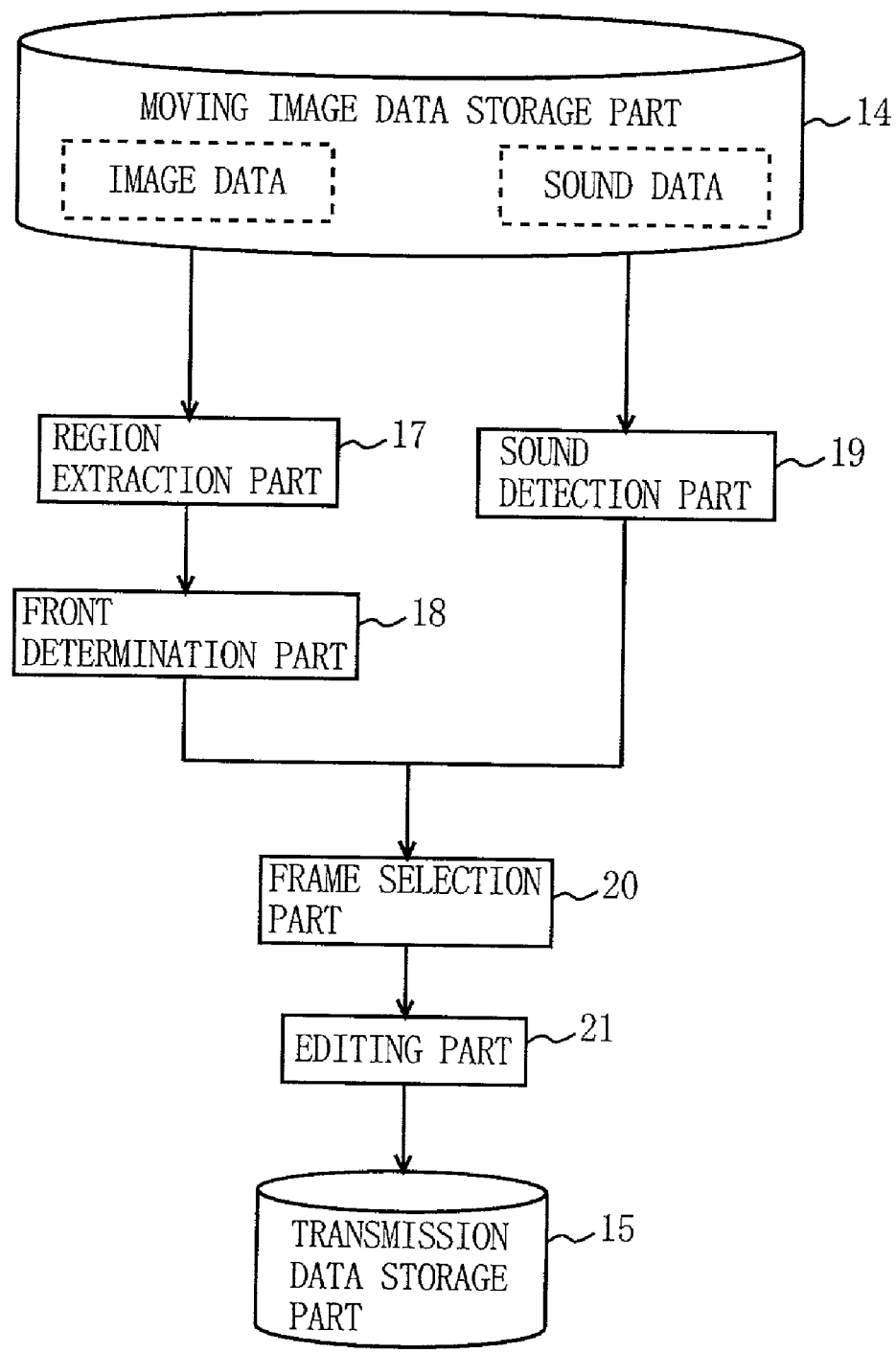

```
...

<VideoSegment id= "START POINT" >
      <MediaTime>
            <MediaTimePoint>T13:20:01:1F15</MediaTimePoint>
      </MediaTime>
</VideoSegment>

...

<VideoSegment id= "END POINT" >
      <MediaTime>
            <MediaTimePoint>T13:23:20:15F15</MediaTimePoint>
      </MediaTime>
</VideoSegment>
```

F I G. 9

```
...
<VideoSegment id= "FIRST FRAME" >
    <MediaTime>
        <MediaTimePoint>T13:20:01:1F15</MediaTimePoint>
    </MediaTime>
    <StillRegion id= "PARTIAL REGION INFORMATION" >
        <ContourShape numberOfPeaks= "4" >

...
        </ContourShape>
    </StillRegion>
</VideoSegment>

...
<VideoSegment id= "SECOND FRAME" >
    <MediaTime>
        <MediaTimePoint>T13:23:20:15F15</MediaTimePoint>
    </MediaTime>
    <StillRegion id= "PARTIAL REGION INFORMATION" >
        <ContourShape numberOfPeaks= "4" >

...
        </ContourShape>
    </StillRegion>
</VideoSegment>

...
<VideoSegment id= "THIRD FRAME" >
    <MediaTime>
        <MediaTimePoint>T13:29:02:3F15</MediaTimePoint>
    </MediaTime>
    <StillRegion id= "PARTIAL REGION INFORMATION" >
        <ContourShape numberOfPeaks= "4" >

...
        </ContourShape>
    </StillRegion
</VideoSegment>
```

```
...
<VideoText id= "VideoText1"
    textType= "Superimposed" fontSize= "40" fontType= "GOTHIC" >
    <MediaTime>
        <MediaTimePoint>T13:20:01:1F15</MediaTimePoint>
        <MediaDuration>PT6S</MediaDuration>
    </MediaTime>

...
    <Text>HOWDY? HERE IS MY MESSAGE. TAKE A LOOK.</Text>
</VideoText>
```

DISPLAY SCREEN

F I G. 1 5
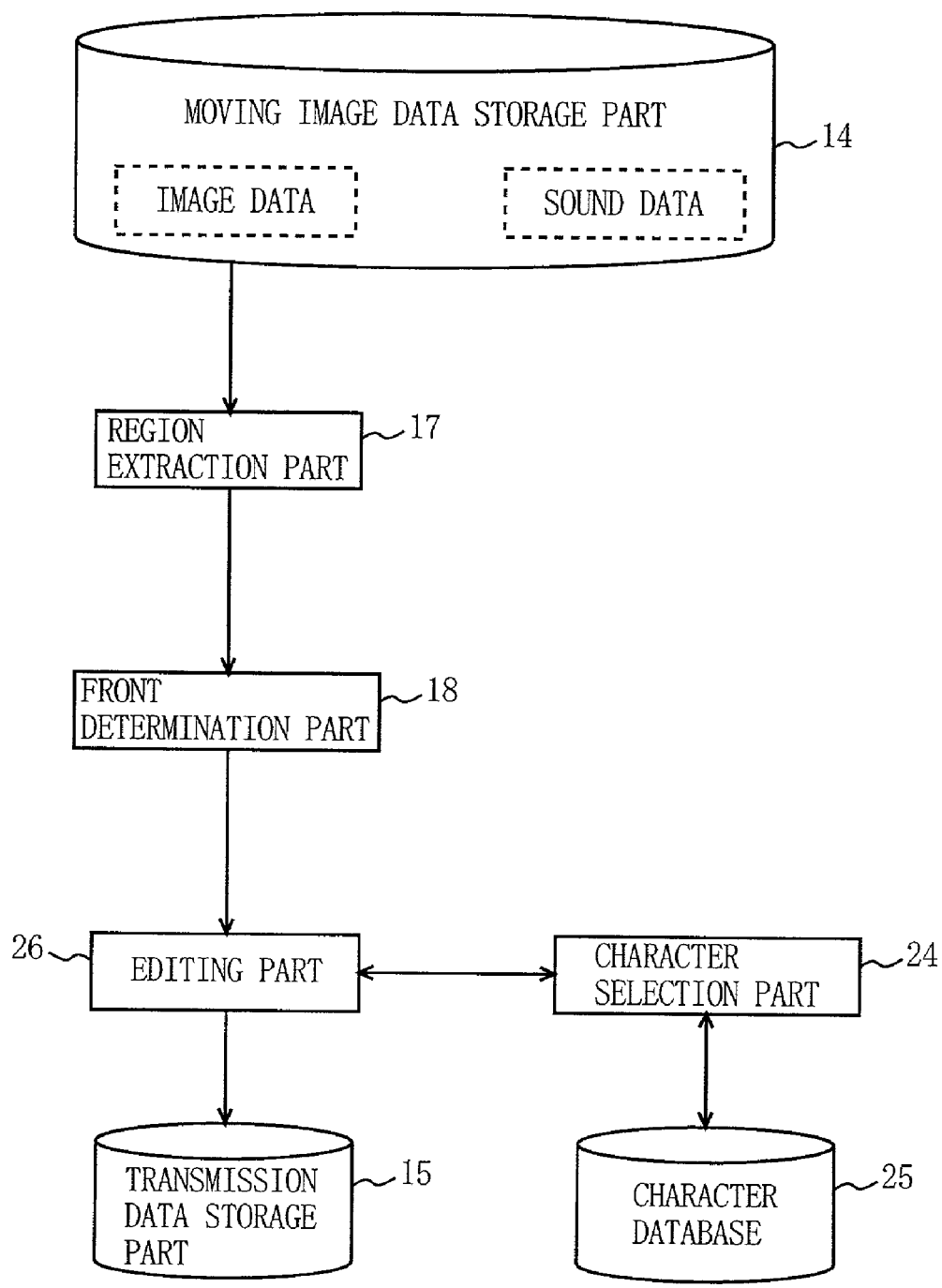

FIG. 16

| CAPTURED IMAGES | | | | | | | |
|---|---|---|---|---|---|---|---|
| PROCESSING RESULTS | | | | | | | |
| CHARACTERISTIC VALUES | NORMALIZED AREA | 0.289 | 0.581 | 1.777 | 2.257 | 2.439 | 1.82 |
| | NORMALIZED CIRCUMFERENCE | 3.71 | 9.31 | 12.3 | 13.1 | 24.3 | 22.7 |
| EXEMPLARY CHARACTERISTIC REPRESENTATIONS | AMOUNT OF HAIR | SMALLER | | LARGER | | | |
| | HAIR STYLE | SHORT | | | | LONG | |

METHOD AND DEVICE FOR MEDIA EDITING

BACKGROUND OF THE INVENTION

1. Field of the Invention

The present invention relates to methods and devices for editing media including still or moving images and, more specifically, to a method and device for editing media including images specifically for communication made through visualphones, videomails, doorphones (intercoms), videoconferences, and videochats, for example.

2. Description of the Background Art

There have been proposed a number of devices for once recording a sequence of events occurring at meetings, seminars, and interviews, communication over phones and videophones, images from televisions and monitor cameras, for later reproduction, by means of digital disks, digital still cameras, video tapes, or semiconductor memories, for example. The devices for such recording and reproduction have become popular as they are more reliable than hand writing, for recording sound and image information.

With broadband communications that is recently widely available, information devices exemplarily including videophones, doorphones, and camera-equipped mobile terminals are now popularly used for person-to-person communication with sound and image information. For example, e-mails conventionally exchanged by text are now being replaced by videomails using sound and moving images. Also, with the widespread use of visualphones, messages left in answering machines so far recorded only by sound are now often accompanying video information. As such, simultaneous use of sound and moving images is now prevalent for the recent form of communication.

Here, when messages and other data, e.g., "message leavings" (i.e., messages left by a caller in response to an automatic answering announcement) in the form of videomail or moving images, are once stored as media, the following steps are usually taken:
(1) Press a recording button provided on a recording device.
(2) Record whatever message.
(3) Lastly, press an end button.

In the following embodiments of the present invention, media denotes any message (or message data) for communication using still and moving images, for example.

If the stored message is sent out to somewhere over a communications line, the following step is often taken:
(4) Determine which portion of the stored message to send, then clip out that portion for sending.

In the case that the stored message is a videomail to a friend, for example, the following step may be taken:
(5) Perform media editing to the message, including wallpapering, cartoon-like-character arranging, image cutting-out, and the like.

Among those steps, in step (4), when determining which portion of the message (that is, determining start and end points for clipping), the user has to playback and listen to the stored message. However, the user may find it difficult or impossible to do such clipping when using a camera-equipped mobile terminal, an answering machine, and the like.

Thus, it may be preferable, at step (3) above, if clipping can be done without the user having to playback the message to determine which portion of the message to send. Such a method is disclosed in Japanese Patent Laid-Open Publication No. 6-343146 (1994-343146), where a user input is provided while a message is being recorded, so that signals will be reproduced only for the specific duration of time designated by the input. In this method, however, sound and image information which is only within the time duration thus determined by the user input is played back as a message. Any information extending beyond this time duration will not be played back at all. Further, the only deciding factor for determining which portion is to be clipped out is the timing with which the user input is provided. Accordingly, the user's operation requires caution, and the operation itself may be cumbersome.

Therefore, it would be preferable if, without the need for user input as above, a clipping portion could be automatically detected in moving images under a predetermined condition. Such a method is disclosed in Japanese Patent Laid-Open Publication No. 9-294239 (1997-294239), where any portion satisfying a predetermined clipping condition is detected in incoming sound or image information. The predetermined condition exemplarily includes the presence or absence of a sound signal of a predetermined level or higher, the change in image brightness or color distribution, captured image movement, and the like.

Such conventional method, however, causes the following problems if applied to general-type "message leavings" in the form of videomail or moving images showing one person, most of the time, facing to a camera.

First, clipping out the moving images based on the presence or absence of a sound signal is not suited for message leavings using doorphones and visualphones. This is because, in such cases, clipping will not be enabled by messages carrying no sound, so that there is no knowing who may have visited or called. Clipping based on the change in image brightness and captured image movement is not either considered suitable since general message leavings in the form of videomail or moving images often hardly change in image brightness and movement, therefore causing difficulty in clipping.

Moreover, in the above conventional method, every portion satisfying a predetermined condition will be clipped out. If this method is applied to message leavings in the form of videomail or moving images, however, clipping may occur a plurality of times, resulting in one message being split into several pieces. Specifically, if the presence or absence of a sound signal is utilized as the predetermined condition, any moments of silence during message recording will split the resultant message into pieces. This is not desirable for message leavings, each of which is preferably comprised of a single piece. Moreover, even if such split pieces are somehow put together for reproduction, the resultant message will still contain awkward pauses.

As in the above step (5) decorating and editing videomails for display, for example, often requires cumbersome operation and therefore is not common yet. Such decoration/edition is, if at all, performed for still images, e.g., by decorating still images with wallpapers (as in the customizable photo sticker machines commonly seen in video game parlors or the like, for example), or attaching a still-image character decoration to text mails. Further, as for mobile phone terminals available in the market, the operation is desirably done only by a thumb. Thus, such decorating and editing will become more cumbersome. The issue here is, for arranging necessary information so as to be displayable on such small display screens of mobile phone terminals, media editing becomes essential. However, no media editing method has been available that can be suitably used for mobile terminals.

SUMMARY OF THE INVENTION

Therefore, an object of the present invention is to provide a media editing method where media including moving images of, most of the time, one person facing to a camera can be easily edited as appropriate.

The present invention has the following features to attain the object above.

The present invention is directed to a media editing method for editing media including an image sequence comprised of a plurality of images showing a user partially or entirely as a subject, and the following steps are included. A region extracting step extracts a region from the images including the user partially or entirely. A front determining step determines whether or not the user included in the region extracted in the region extracting step is facing a predesignated direction. A frame selecting step selects a part of the image sequence between time points determined as the user facing the predesignated direction in the front determining step by scanning the image sequence from a start point to an end point, and from the end point to the start point. An editing step edits the media including the image sequence selected in the frame selecting step.

Further, a predesignated face orientation determining step may determine whether or not the user is facing the front. A sound detection step may be also included to detect a sound included in the media. Moreover, the frame selecting step may select, by scanning the image sequence from the start point to the end point, and from the end point to the start point, the part of the image sequence between the time points determined in the determining step as the user facing the predesignated direction, and between time points at which a sound is each detected.

Moreover, the editing step may specify the image sequence selected in the frame selecting step by description in a meta-data format, clip out the image sequence from the media, or select the first image in the image sequence as an initial display image. The editing step may calculate a partial region corresponding to the image sequence based on a position and size of the region extracted in the frame extracting step, and perform editing by using the partial region, or the partial region may be specified by description in a meta data format.

Further, the editing step may arrange text included in the media onto an arrangement region or a speech bubble region which is so set as not to overlap at all the region extracted in the frame extracting step, or to overlap as little as possible if it overlaps.

The editing step also may perform an image conversion process for one or more of the images, or refer to a face characteristic calculated based on the face region extracted in the extracting step, and from a character database storing a plurality of character images and the face characteristic each corresponding thereto, select one or more of the character images.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing the hardware structure of a media editing terminal capable of image communications realizing a media editing method of the present invention;

FIG. 3 is a block diagram showing the functional structure of a media editing device according to a first embodiment;

FIG. 9 is a diagram showing exemplary meta-data Description for a partial region;

FIG. 15 is a block diagram showing the functional structure of a media editing device according to a fourth embodiment;

FIG. 16 is a diagram exemplarily showing face characteristic values specifically focusing on the hair;

Figure 2:
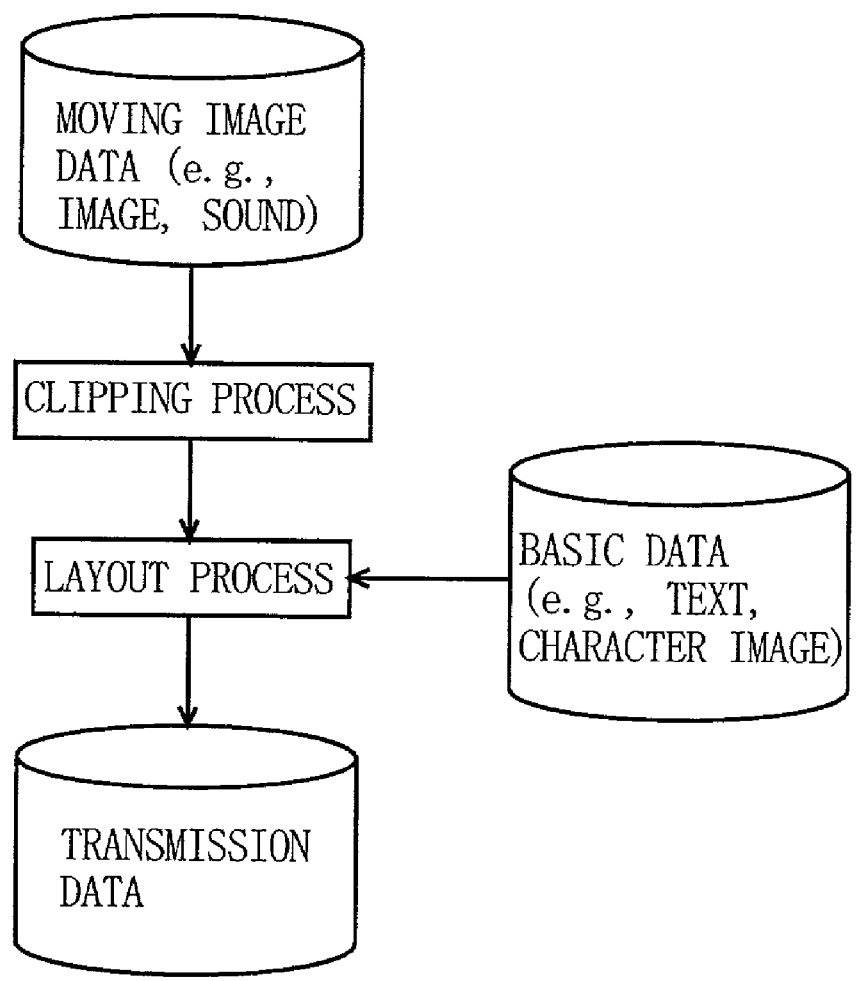
FIG. 2 is a block diagram showing the information flow and procedure of the processing at the time of media editing of the present invention.

DESCRIPTION OF THE PREFERRED EMBODIMENTS (General Structure of Embodiments)

With reference to the accompanying drawings, embodiments of the present invention are generally described below.

With a method and device for media editing of the present invention, a convenient interface can be provided for a user to create message leavings in the form of videomail by using a personal or home image communications terminal such as a visualphone, a mobile terminal, a doorphone, or the like.

FIG. 1 is a block diagram showing the hardware structure of a media editing terminal where image communications are carried out in such a manner as to realize the media editing method of the present invention. In FIG. 1, the present media editing terminal includes an input part 1, an image capturing part 2, an image display part 3, a sound input part 4, and a sound output part 5, all of which receive/provide information from/to the user. Further, included are an image-capturing control part 6, a sound input/output control part 7, a display control part 8, a communications part 9, a recording part 10, a recording control part 11, a signal processing part 12, and a control part 13, all of which process the information received/provided by the user. These constituents are interconnected via a system bus, an external bus, and the like. Here, the above structure is identical or similar to that of a general-type computer.

The input part 1 is composed of a keyboard (e.g., a ten-key numerical pad included), a mouse, and the like, and various types of information and documents in text form necessary for the user to do media editing are inputted therefrom.

The image capturing part 2 is composed of a CCD camera, and the like, and moving images structured by at least one or more images are inputted therefrom. Here, the image capturing part 2 basically works cooperatively with the sound input part 4, which will be described later, and typically captures moving images of the user doing message recording.

The sound input part 4 is composed of a microphone, and the like, and sound outside the device is inputted therefrom. Here, the sound input part 4 basically works cooperatively with the image capturing part 2, and typically acquires the user's voice doing message recording.

The image display part 3 is composed of a liquid crystal display, and the like, and displays, to the user, his/her recorded moving images and characters (e.g., alphanumeric), received moving images and characters, and various information operationally necessary, for example.

The sound output part 5 is composed of a speaker, and the like, and outputs, to the user, his/her recorded voice, received sound, and warning sound and beep as operationally necessary, for example.

The image-capturing control part 6 performs ON/OFF control, exposure control, and other controls with respect to the image capturing part 2. The sound input/output control part 7 performs ON/OFF control, and other controls with respect to the sound input and output parts 4 and 5. The display control part 8 controls the image display part 3.

The communications part 9 transmits/receives, to/from other information processing devices, various types of data wirelessly or over the communications path such as a public telephone line. As for the data, see the description below. The communications part 9 may be in whatever communications mode, including synchronous communications such as visualphones, or asynchronous communications such as e-mails, for example.

The recording part 10 is composed of a recording medium such as a memory, a hard disk, and the like, and records data at least provided by the image capturing part 2 and the sound input part 4. The recording part 10 may include a recording medium such as a CD-ROM, a DVD, and the like, and a drive therefor. The recording control part 11 performs input/output control with respect to the recording part 10.

The signal processing part 12 is composed of a digital signal processor, and the like, and in editing of the later-described embodiments, goes through any process necessary for image signals provided by the image capturing part 2, sound signals from the sound input part 4, and data recorded on the recording part 10.

The control part 13 is composed of a microcomputer, a CPU, or the like, and controls the data flow for various processes.

Here, the present media editing terminal may be of an integrated-type including every constituent mentioned above in one housing, or of a distributed-type performing data exchange among the constituents over a network or signal lines. For example, a camera-equipped mobile phone terminal is of the integrated-type carrying every constituent in a single housing. On the other hand, a doorphone is regarded as of the distributed-type because, at least, the image capturing part 2, the sound input part 4, and the sound output part 5 are externally located in the vicinity of the door, and the remaining parts are placed in another housing located in the living room, for example. This is for establishing an interface with visitors. Alternatively, such a distributed-type device may have a character database (later described) located outside.

Described next is the comprehensive procedure for the user to generate transmission data under the media editing method of the present invention. FIG. 2 is a block diagram showing the information flow and the procedure at the time of media editing of the present invention.

First, the user inputs a command to have the input part 1 of FIG. 1 started receiving image and sound data. Then, the user inputs his/her message, for example, via the image capturing part 2 and the sound input part 4 to generate moving image data.

Thus generated moving image data often includes, both at the head and tail, a portion carrying unnecessary information for the user. Accordingly, a clipping process is performed to eliminate those unnecessary portions at the head and tail of the moving image data. The details of the process are left for later description.

Performed next is a layout process to display, on a single screen, any useful information (e.g., time and date when the data was generated by whom) for a data addressee together with the generated moving image data. In detail, after clipping, a trimming process is applied to cut out from the moving image data any specific region having the user (message recorder) centered. Then, the resultant region is arranged with, for example, text and cartoon-like character images, which are generated as basic data. Here, the basic data presumably denotes whatever data to be added to the moving image data, exemplified by images, text, and computer graphics. The basic data may be a previously-generated image pattern, a character pattern, or a code pattern. Moreover, the layout process is typically described in a meta data format including MIME (Multipurpose Internet Message (Mail) Extensions), HTML (Hyper Text Markup Language), XML (eXtensible Markup Language), MPEG-7, for example. After the above processes are through, eventually generated is transmission data, which is a message for a data addressee.

Here, the clipping process and the layout process are both performed in the signal processing part 1, the control part 13, the recording control part 11, and the recording part 10 of FIG. 1. Typically, these processes are realized by a program executable by computer devices. The program is provided from a computer-readable recording medium, e.g., a CD-ROM, a semiconductor memory card, to the recording part 10, for example, and then downloaded over the communications lines.

As already described, if those processes are applied under the conventional method, user input is required frequently. In more detail, in the clipping process, the user is expected to make an input of a clipping portion while checking the moving images and sound. Moreover, in the layout process, the user is required to do editing operation while considering what layout. Especially, for trimming in the layout process, the user has to go through the moving image data on a frame basis to choose cutting regions therefrom. This is very bothersome for the user. When attaching the basic data, the user also has to define the attachment position while referring to the moving image data for the subject's position and size.

With the device and method for media editing according to each of the embodiments of the present invention, either one or both of the signal processing part 12 and the control part 13 go through a region extraction process, a front determination process, and a sound detection process, all of which will be described later. With these processes, successfully provided is a convenient interface with which any process the user finding bothersome (in particular, clipping, trimming, and editing of basic data arrangement) is automated.

Generally, once the user creates a message in the form of videomail by his/her mobile terminal, he/she may have an itch to immediately send out the message. With the convenient interface provided, the user's needs are thus met with a videomail created with a simple operation (e.g., one button operation). What is better, the resultant videomail layout is comprehensible to its addressee, having the message clipped at the beginning and end, the image trimmed to have the user centered, and wallpaper and speech bubbles arranged as appropriate, for example. Herein, not all of the above processes are necessarily applied in the following embodiments, and combining any process needed for each different application will do. In the below, the embodiments of the present invention are individually described in detail.

(First Embodiment)

A media editing device of a first embodiment enables the aforementioned clipping process of FIG. 2 in an automatic manner. FIG. 3 is a block diagram showing the functional structure of the media editing device of the first embodiment. In FIG. 3, the present media editing device includes a moving image data storage part 14, a transmission data storage part 15, a region extraction part 17, a front determination part 18, a sound detection part 19, a frame selection part 20, and an editing part 21. These constituents carry out entirely or partially the clipping process of FIG. 2.

The moving image data storage part 14 corresponds to the recording part 10 of FIG. 1, and stores moving image data recorded by the user as a message. The region extraction part 17 extracts, from the moving image data in storage, any specific region including entirely or partially the image of the subject (the user). The front determination part 18 detects whether or not the user in the extracted region is facing the front. The sound detection part 19 detects, on a frame basis in the moving image data, whether there is any sound signal of a predetermined level or higher. Based on the results outputted from the front determination part 18 and the sound detection part 19, the frame selection part 20 determines starting and ending frames. The editing part 21 performs media clipping based on thus determined starting and ending frames, and then media editing, e.g., image conversion process. The transmission data storage part 15 also corresponds to the recording part 10 of FIG. 1, and stores the resultant edited media as transmission data, which will be transmitted as required.

Figure 4:
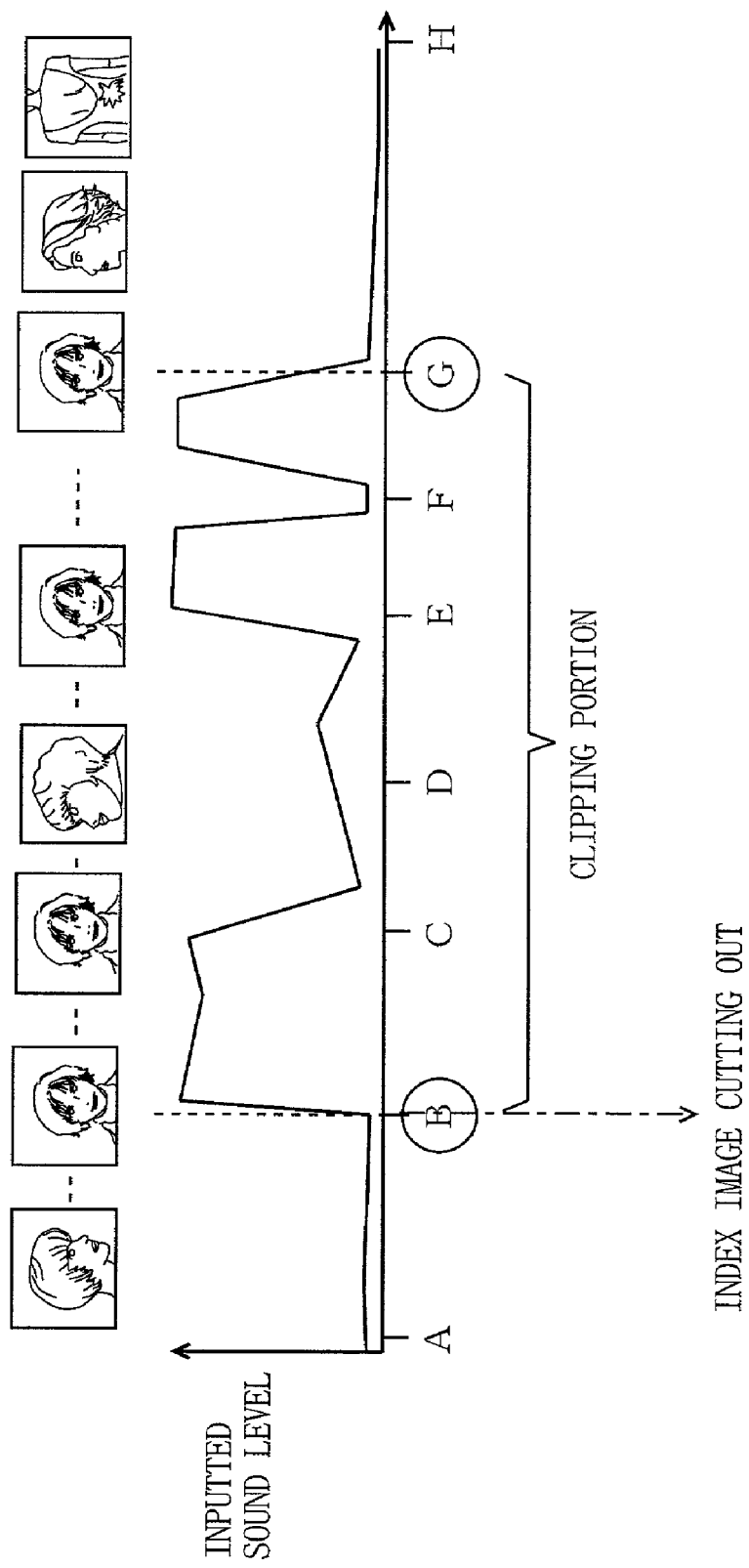
FIG. 4 is a diagram for illustrating a clipping process applied to certain moving image data.

Described next is the operation of these constituents. FIG. 4 is a diagram for illustrating the clipping process applied to certain moving image data. In FIG. 4, the clipping process is applied to the moving image data stored in the moving image data storage part 14. Here, the moving image data is composed of sound data including the user's recorded message, and image data recorded synchronously therewith. The image data and the sound data may be structured as one data, or structured separately as the image data, the sound data, and data indicating the relationship therebetween in terms of synchronization. The data exemplified in FIG. 4 is a typical message often acquired through a doorphone, and the like, and composed of eight scenes (points in time) A to H in the drawing. At each point in time, the user's (recorder's) behavior appears as follows.

A. Start data recording
B. Start first message
C. End first message
D. Pause before continuing message
E. Start second message
F. No sound (e.g., breathing)
G. End second message
H. End data recording Here, as for the graph in the drawing, the lateral axis indicates a lapse of time, while the longitudinal axis an inputted sound level. Alphabetical letters A to H each indicate a predetermined time. Each of the cartoon sketches above the graph represents a scene in the image data, which is recorded simultaneously with the sound substantially at the predetermined time point (A to H). The cartoon sketches are exemplary of the user's behavior in the course of message recording through the doorphone before leaving the place.

As is known from FIG. 4, the generated moving image data often carries, at the beginning and end, information irrelevant to the user's intention. This is because people usually take pauses before and after recording their messages. Focusing attention on such characteristic of the moving image data conveying messages, the present media editing device automatically determines a clipping portion in image data and sound data under the following methods.

Described first is a method for detecting a start point for clipping. To detect a start point, the region extraction part 17 first detects, on a frame basis in the image data, any region including the subject (the user) in a time sequence (i.e., from A to H in FIG. 4).

There have been various methods for extracting regions including the subject. For example, disclosed in Japanese Patent Laid-Open Publication No. 5-91407 (1993-91407) is a method for first defining any part where movement change is small as a background, and extracting other regions as "subject regions". Here, the movement change is determined based on relative comparison between video signals in any two adjoining frames of the moving images. Another method for extracting subject regions is disclosed in Japanese Patent Laid-Open Publication No. 5-161131 (1993-161131). In this method, any image showing only the background is retained in advance to use for finding and computing any difference from each frame of the moving images on a pixel basis. Herein, whatever region not so different from the background is regarded as a background region, and if the difference is conspicuous, the region is extracted as the subject region. As another method, to extract any specific part of the subject such as a head or a face, images are searched for any ellipse region. Such method is described in "Human Head Tracking using Adaptive Appearance Models with a Fixed-Viewpoint Pan-Tilt-Zoom Camera" by Yachi et al., MIRU2000, Meeting on Image Recognition and Understanding, pp. 9–14. There are various other known methods for detecting a face image based on color information, focusing on a specific part of the face such as eyes, a mouth, or the like, and a method based on template matching. Under these conventional methods, the region extraction part 17 can easily extract subject regions.

Next, as for the regions extracted by the region extraction part 17, the front determination part 18 detects whether or not the user therein is facing the front. For such detection, there have been various methods. As an example, a front image is previously prepared as a template for template matching. As another example, there is a method for identifying the face orientation in images by applying SVM (Support Vector Machine) which is a statistical feature-recognition technique. The method is described in "Head Classifier: A Real-time Face Classification System" by Baba et al., the 7th Symposium on Sensing via Image Information, pp. 411–416. Under such conventional methods, the front determination part 18 can determine whether or not the person in the image is facing the front. Also, with a designated face orientation determination part provided in place of the front determination part 18, determined is whether the user in the image region is facing a predetermined direction (e.g., 45 degrees to the right). With such structure, the user's best face orientation can be designated in advance for image selection.

The sound detection part 19 detects whether there is any sound signal of a predetermined level or higher. The predetermined level is exemplarily determined in consideration of the ambient noise level and the average level of the inputted sound. Alternatively, the presence or absence of human voice may be detected under any known voice recognition method.

With reference to the results obtained by the front determination part 18 and the sound detection part 19, the frame selection part 20 checks, on a frame basis, the image data from the start point to the end point. Here, a frame first satisfying the conditions is regarded as a starting frame. The frame selection part 20 also checks the frames in the reverse direction, that is, from the end point to the start point of the image data, and this time, a frame first satisfying the condition is regarded as an ending frame. Here, the result from the front determination part 18 tells that the user in the images of FIG. 4 is facing the front firstly at point B, and lastly at point G. Also, the result from the sound detection part 19 tells that the inputted sound level firstly reaches a predetermined level or higher at point B, and lastly at point G. The frame selection part 20 does not perform frame selection unless otherwise all of the conditions are satisfied. Thus, in this example, the starting frame is the one at point B, and the ending frame at point G.

As such, the media editing device of the present invention scans image data in both directions from a start point to an end point, and from the end point to the start point, to find time points each satisfying conditions first. In this manner, clipping can be done to a message in its entirety without cutting a time interval (before and after point D) which is a pause during message recording. Therefore, this media editing device is suitably used for transmission of videomail, which contains user's input data as a single piece.

Further, since the present media editing device performs both front determination and sound detection, clipping can be done with reliability to a part recorded as a message. Specifically, even if the user is facing the camera, but deep in thought, clipping never misses a time point when he/she starts speaking. Here, the present media editing device can achieve almost the same effects without sound detection. This is because the user normally faces toward the camera to start message recording, and thus front determination sufficiently serves the purpose. Also, if the user utters in spite of his/her intention before starting message recording, sound detection may not be considered effective. Therefore, the sound detection part 19 may be omissible.

Next, the editing part 21 performs media (moving image data) clipping on the basis of the starting and ending frames determined by the frame selection part 20. Here, the resultant moving image data generated by the editing part 21 may include only the clipped portion and the remainder is deleted, or the resultant data may be meta data including the clipped portion as an index. If the resultant data is meta data, no moving image data has been deleted, and thus any portion not clipped, but important can be saved for later use. Exemplified below is a case where the meta data format is MPEG-7.

There have been various standards and private standards for a description format of meta data, and among those, MPEG-7 is of the latest, for example. MPEG-7, called as Multimedia Content Description Interface (ISO/IEC 15938), is the fourth standards after MPEG-1, MPEG-2, and MPEG-4, all of which have been standardized by MPEG (Moving Picture Experts Group: ISO/IEC JTC1/SC29/WG11). These standards are the ones defining outlines for description of the details of multimedia information, and aimed to be used for applications for retrieving and editing digital libraries. As for MPEG-7, defined thereby are standard groups of Descriptor for describing the details of multimedia information mainly including video and sound information. By applying the resultant Description to contents, retrieval can be done based on the details of the multimedia information. The actual description definition language of this standards has been extended as needed with respect to XMLSchema language. Here, this extension is compatible with the grammar of XMLSchema language.

Under such MPEG-7, in order to describe the characteristics of the contents, the following basic elements may be combined together.

1. Descriptor (or Simply Referred to as "D")

Descriptor is a basic tool for describing a certain single characteristic of multimedia contents. In MPEG-7, Descriptor is defined by Syntax and Semantics.

2. Description Scheme (or Simply Referred to as "DS")

Description Scheme is an outline which defines the structures or semantic relationships among a plurality of description tools. In MPEG-7, similarly, Description Scheme is defined by Syntax and Semantics. Here, as for description tools structuring Description Scheme, other Description Schemes are included together with Descriptors.

3. Description Definition Language

Description Definition Language is a language for defining notations for Descriptors and Description Schemes. In MPEG-7, on the basis of "XML Schema" which is a schema language standardized by W3C (World Wide Web Consortium), various data types to be needed for describing characteristics of multimedia contents are added. In this manner, Description Definition language is defined.

Description Scheme (DS) exemplarily includes "VideoSegmentDS" which is a pointer to a specific part of moving image data, and "StillRegionDS" used to describe regions in images. As for Descriptor (D), exemplified is a "MediaFormat" which describes media formats. Note that, in MPEG-7, together with Descriptors and Description Schemes standardly defined, a language for defining or extending any new Descriptor and Description Scheme (Description Definition Language) is also defined. Therefore, when meta data is used in the present media editing device, describing the meta data based on such a language will result in Description in the MPEG-7 format.

Figures 5, 6:
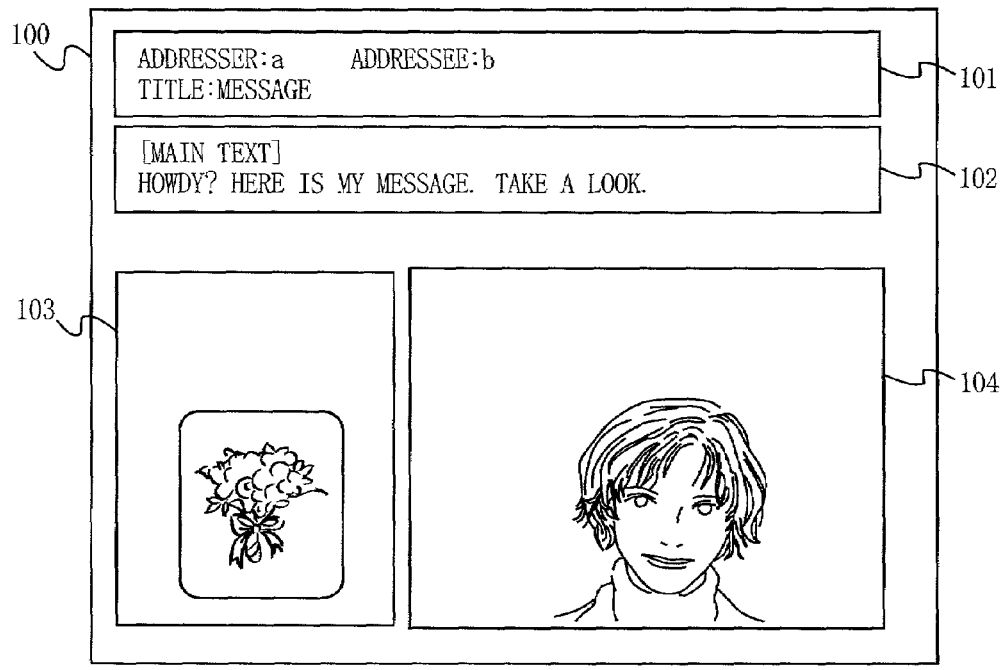
FIG. 5 is a diagram exemplarily showing meta data having index information of FIG. 4 described based on MPEG-7 standards.
FIG. 6 is a diagram showing an exemplary screen display of a terminal receiving a videomail which includes moving image data, and information (e.g., addresser, title)

FIG. 5 is a diagram exemplarily showing meta data having index information of FIG. 4 described based on MPEG-7 standards. In the meta data of FIG. 5, "VideoSegmentDS" is used to interrelate points B and G to each corresponding image frame. Here, such interrelation to the actual image frames is established by "MediaTimePoint" of "MediaTime", and resultantly described is the time of the corresponding VideoSegment. For example, the description of "T13:20:01:1F15" found in FIG. 5 means "the first frame at 13:20, 01 second (note that, 15 frames per second, from frames 0 to 14)". With such description of meta data, reproduction control for selecting only a specific portion of the moving image data becomes possible.

Here, the above is no more than an example, and there is no limitation for description formats. In other words, any format will do for describing meta data as long as it can be interrelated to contents. Here, for convenience of illustrating by drawings, the meta data is exemplarily described in text format, but this is not restrictive. The format may be binary, for example.

As such, when the resultant data is meta data including a clipping portion as an index with no moving image data deleted, editing can be done without restraint if the data needs to be corrected after automatic clipping. This is because, unlike the case where the resultant data is moving image data including only the clipped portion, only the meta data needs to be re-edited.

In the above, the starting and ending frames provided by the frame selection part 20 are utilized for automatic clipping. Here, the starting frame may be defined as being an image appearing first on a terminal screen on the receiver end. In this sense, the clipping technique of the present media editing device is considered even more effective. To be more specific, assuming a case where the user first sees a still image (e.g., a preview image, thumbnail image) showing what moving images are coming or already in storage. Here, such a still image is now referred to as an initial display image. In the example of FIG. 4, the first frame image is the one at point A. However, the image at A shows the user not facing towards the camera, and it is not considered suitable for the initial display image such as a preview or a thumbnail image. Accordingly, by using the meta data as illustrated in FIG. 5, the starting frame is defined as the initial display image. As a result, the frame image at point B showing the user facing the front is suitably displayed as the initial display image. The present media editing device thus has no need to newly transmit a still image as the initial display image to the receiver end. If newly transmitting, the media editing device uses the region extraction part 17 and the front determination part 18 to scan the data from the start point to the end point. Point B is resultantly detected, and the frame image corresponding thereto is transmitted as the initial display image. In this manner, the image showing the user facing the front appropriately goes to the receiver end.

To the initial display image or the moving image data in its entirety, the editing part 21 may apply an image conversion process, e.g., a resolution conversion process. If this is the case, display can be optimal in consideration of the resolution on the receiver terminal, and with lower resolution, information to be transmitted becomes less in amount. As the image conversion process, a representation conversion process may be carried out, including digitization and gray scale processing, for example. With such process, display color can be changed in accordance with that on the receiver terminal.

As such, the media editing device of the present invention determines whether or not a user in an image is facing the front. Therefore, only a message part to an addressee can be automatically clipped out with reliability, and the addressee reproduces only any portion he/she needs. Further, whatever image suitable as an initial display image can be easily set.

(Second Embodiment)

With a media editing device according to a second embodiment, the aforementioned trimming process is automated so that the resultant layout becomes well-organized, with efficiency, even for a small screen on the receiver end.

Described first is an assumable case in the present embodiment. Generally, any media to be transmitted in the form of videomail includes, not only moving image data, but information about who has sent the moving images with what title, for example. FIG. 6 is a diagram showing an exemplary screen display of a terminal receiving such a videomail. As shown in FIG. 6, on a display image 100, displayed are a moving image section 104, a header section 101 exemplarily indicating who has sent the videomail to whom with what title, a text section 102, and a decoration section 103 having decorations appropriately laid out.

To display such a display image of FIG. 6 on a small screen of a mobile terminal, the image is often reduced in size in its entirety. Such reduction in size, however, causes the text to be illegible, or the subject's face in the moving image data to be smaller.

Here, moving image data inputted as a message is generally captured by a wide-angle lens so as not to distract the user with the positional relationship between the camera and the subject. This is the reason why the moving image section 104 of FIG. 6 contains a high proportion of background region behind the user's image. Therefore, if the image is reduced in size in its entirety for display, the user's face inconveniently looks much smaller.

The media editing device of the present embodiment includes at least the following constituents so that a layout process is performed in a manner that only a partial image including the user is displayed on the display screen. Here, for the clipping process aforementioned in the first embodiment, any corresponding constituent of FIG. 3 may be added. Therefore, no further description is provided here.

Figure 7:
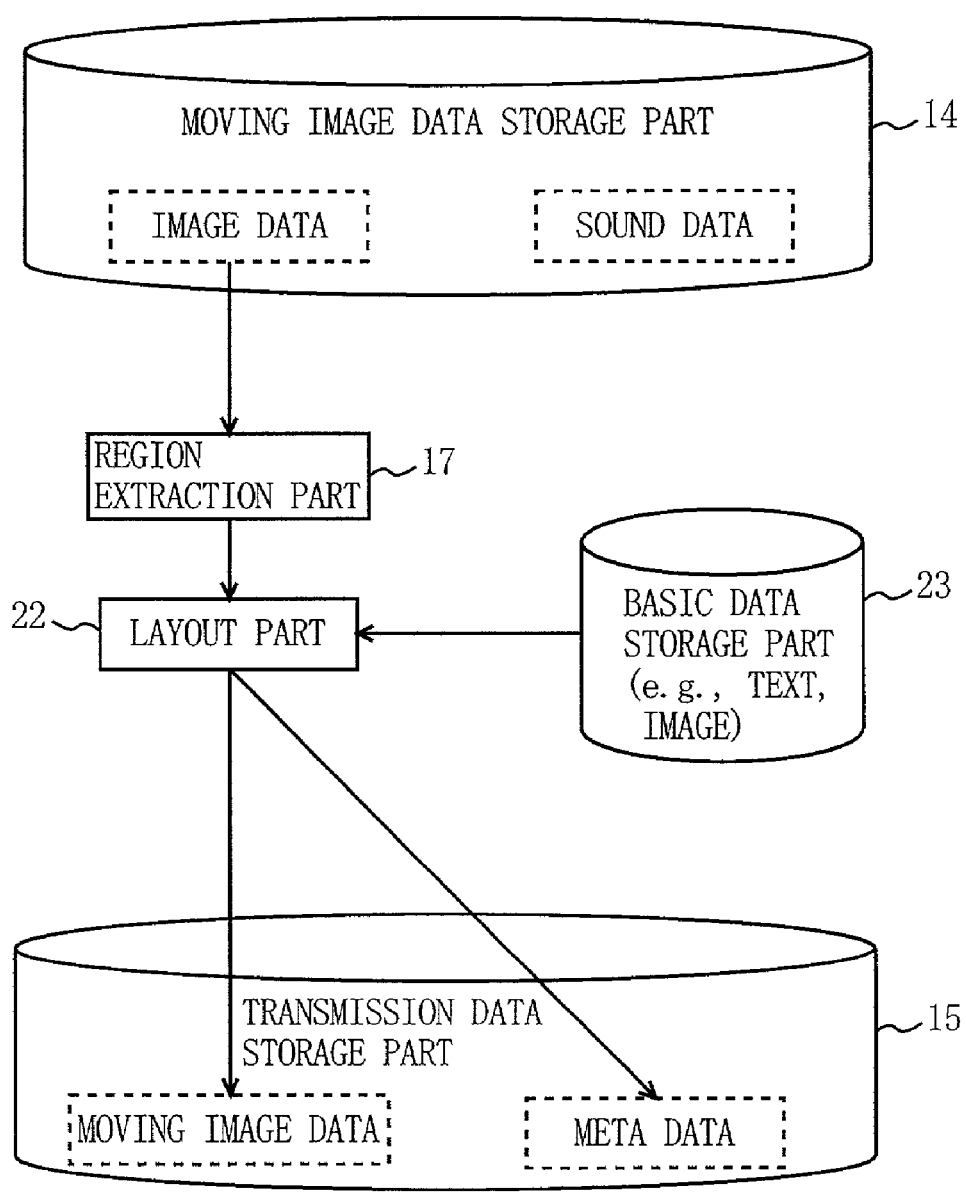
FIG. 7 is a block diagram showing the functional structure of a media editing device according to a second embodiment.

FIG. 7 is a block diagram showing the functional structure of the media editing device of the second embodiment. In FIG. 7, the present media editing device includes the moving image data storage part 14, the transmission data storage part 15, the region extraction part 17, a layout part 22, and a basic data storage part 23. These constituents perform partially or entirely the aforementioned layout process of FIG. 2.

Here, this media editing device is almost the same in structure and operation as that of the first embodiment, and thus any constituent being the same is provided with the same reference numeral and not described again. Note that, in the present embodiment, sound data is not necessarily required. Therefore, stored in the moving image data storage part 14 may be moving image data similar to that in the first embodiment, or image data carrying no sound.

In FIG. 7, the basic data storage part 23 corresponds to the recording part 10 of FIG. 1, and stored therein are text as shown in FIG. 6, and basic data exemplified by image data for decoration. The layout part 22 reads, as appropriate, the basic data from the basic data storage part 23 by the user's operation, and performs the layout process including the trimming process. The details are left for later description.

Figure 8:
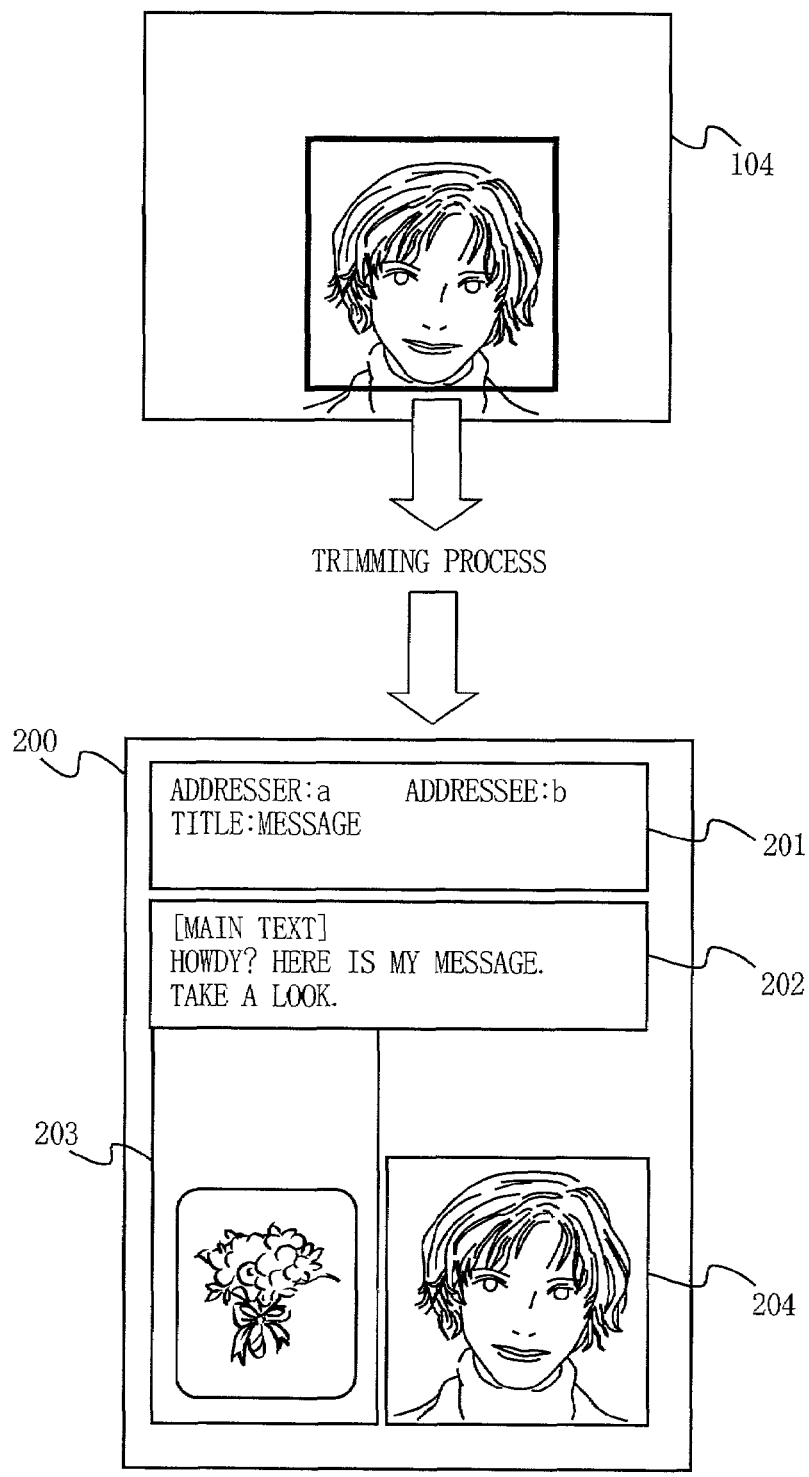
FIG. 8 shows an exemplary trimming process and the resultant display screen.

FIG. 8 shows an exemplary trimming process and the resultant display screen. In FIG. 8, shown in the upper portion is the moving image section 104 received from the same addresser of FIG. 6. Due to the reasons described in the above, the section contains a high proportion of background region behind the user's image. Thus, only the user region is trimmed in the following manner for laying out.

First, from the moving images stored in the moving image data storage part 14, the region extraction part 17 extracts, on a frame basis, any region including the user partially (e.g., his/her face) or entirely. The operation of the region extraction part 17 can be easily realized by the above described method. Here, the resultantly extracted region is not restricted in shape.

Then, based on the regions extracted by the region extraction part 17, the layout part 22 calculates a partial region from the moving image data for display. In FIG. 8, the partial region is indicated by a thick-lined box therearound in the moving image section 104.

The layout part 22 then lays out the image corresponding to the partial region and the user-designated basic data (e.g., text, image) in such a way as to combine those together. In FIG. 8, the resultant display image 200 includes a moving image section 204 corresponding to the partial region, and similarly to FIG. 6, a header section 201, a text section 202, and a decoration section 203. As such, at the time of layout, the moving image data is automatically reduced in size to be an image fitting in the partial region, thereby achieving comprehensible display on a small screen.

The layout part 22 generally generates meta data, which determines what layout with the moving image data and the basic data. Thus, the partial region set by the layout part 22 is preferably also in the meta data format for easy handling.

FIG. 9 is a diagram showing exemplary meta-data Description for such a partial region. Description in FIG. 9 is, as is in the first embodiment, in MPEG-7 format. In this Description, "VideoSegmentDS" described in the first embodiment is applied to each frame, and the frames are each set by a partial region using "Still RegionDS". As for partial region information, "ContourShape" is used to describe the partial region in rectangular (the number of peaks is 4 in the drawing) and the coordinates thereof (not shown).

When the meta data is used as such, unlike newly generating moving image data by cutting out a partial region therefrom, the amount of the moving image data is not reduced. The user on the receiver end, however, can freely change the layout according to the size of the terminal screen or his/her preference. For example, the user can relocate the partial region on the image to suit his/her preference, or make settings to display any other partial region. In such cases also, settings as the partial region set by the layout part 22 initially appearing on the screen are considered convenient. This is because the region indicating who has sent the message is displayed first.

In MPEG-7, not only the method for setting "StillRegionDS" on a frame basis as shown in FIG. 9, but "MovingRegionDS" being information about any moving region, or "AudioVisualRegionDS" being information about a region with sound may be used. As a comprehensive basic definition thereof, there is "SegmentDS" indicating a part of the multimedia contents. With any DS based on this definition, Description equivalent to that of FIG. 9 can be done with less space.

As such, the media editing device of the present invention can define the image by a partial region for display. Therefore, even on a small display screen of a camera-equipped mobile terminal, only a region showing the subject can be displayed in a well-organized manner. Moreover, when Description of meta data is based for layout, the image can be appropriately displayed on the receiver end even with screens varying in size (e.g., camera-equipped mobile terminals, PC terminals).

(Third Embodiment)

With a media editing device of a third embodiment, the trimming process is performed differently from the second embodiment, and the resultant layout displays any needed text together with moving images occupying a sizable proportion of the screen.

Figure 10:
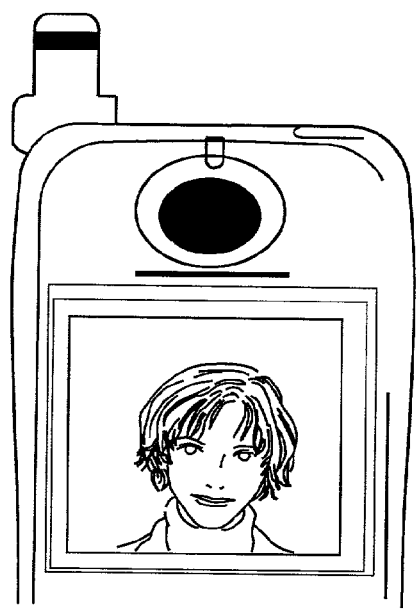
FIG. 10 shows an exemplary display screen showing only moving images with no space left for a title and a main text.

Described first is an assumable case in the present embodiment, specifically a case where the display image 100 of FIG. 6 is trimmed in such a manner that the moving image section 104 occupies a larger space, as much as possible, for display on a small screen (of mobile phone, for example). Here, presumably, information to be displayed on such a small screen is, at least, a "title", "text", and moving images. Actually, the small screen is fully occupied only by the moving images, and there is no space left for the title and text. FIG. 10 shows an exemplary display screen showing only the moving images.

Here, the present media editing device is similar in structure to that of the second embodiment. To display such text information, however, the region extraction part 17 and the layout part 22 in the present media editing device are changed in their operations. In detail, onto the image region including the user (the user's image region) that has been detected by the region extraction part 17, the layout part 22 arranges the text information (e.g., title, text) so as not to overlap at all, or to overlap as little as possible if it overlaps. This operation is described in detail below.

Figure 11:
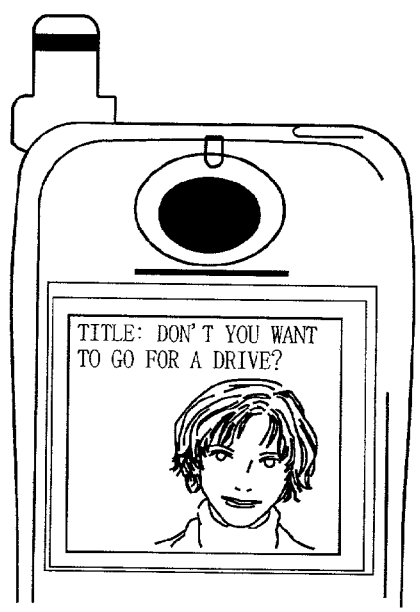
FIG. 11 shows an exemplary display screen where a title is arranged in a region not overlapping an image region including the user.

First, the region extraction part 17 detects the user's image region in the moving image data, and calculates the position and size thereof. Then, the layout part 22 receives the thus calculated position and size of the region, and the basic data (e.g., title, text) stored in the basic data storage part 23. The layout part 22 sets a region for arranging the basic data in the range not overlapping the user's image region at all (or overlapping as little as possible). FIG. 11 shows an exemplary display screen where a text title is arranged in a space not overlapping the user's image region. As shown in FIG. 11, the text title is arranged in a space above the user's head with no overlap. With such arrangement, the resultant layout can contain any needed text together with moving images occupying a sizable proportion.

Figures 12, 13:
FIG. 12 shows an exemplary display screen where a main text is arranged in a region barely overlapping an image region including the user.
FIG. 13 is a diagram showing exemplary Description of meta data about a layout process of writing text into moving images.

Alternatively, the layout part 22 may arbitrarily set the shape of such a region for arranging the basic data. If so, thus set region is now referred to as a speech bubble region. Typically, the speech bubble region is enclosed by a line and is in a specific color (e.g., white). Into the speech bubble region, the layout part 22 writes a main text, which is a part of the basic data. FIG. 12 shows an exemplary display screen where a main text is arranged in a region barely overlapping the user's image region. As shown in FIG. 12, the main text is arranged in a space left side of the user with little overlap. Accordingly, the resultant layout can contain any needed text together with moving images occupying a sizable proportion.

The shape of the speech bubble region shown in FIG. 12 has, as quite familiar in cartoons, a sharp protrusion in the vicinity of the user's mouth. The position of the protrusion is calculated by an image recognition process. Specifically, the region extraction part 17 extracts a mouth region from the user's image region, and calculates its position. The layout part 22 arranges the protrusion onto the thus calculated position (or proximal position considered appropriate), and then sets the speech bubble region in the range not overlapping the user's image region at all (or overlapping as little as possible) in consideration of the number of letters of the text.

The resultant layout image is preferably displayed on the screen as the initial image (aforementioned initial display image) on the receiver end. That is, when opening incoming mail, the addressee first sees the image of FIG. 11 or 12, and checks only the title or the main text therewith. If the main text does not fit in one page, a scrolling process may be applied, for example. As such, the receiver checks a main text, for example, only in the first display image, but not while the moving images are reproduced. This is surely not restrictive, and the main text or the title may be superimposed and displayed when the moving images are reproduced so that the receiver can read the text while hearing and seeing the message in the form of the moving images.

Here, the text to be displayed is not limited to the title or the text. Moreover, the image of FIG. 11 may appear first, and then the image of FIG. 12 may follow by the receiver's operation. Or these images are merged together for display at one time. As such, any structure will do as long as text arrangement is so done as not to overlap the user's image region at all (or overlapping as little as possible).

As described above, in the present media editing device, the resultant layout can be well-organized, and even on a display screen showing both the moving images and text, the receiver will not confuse which is which. Further, by using speech bubble regions, the user in the image looks as if speaking the text, and accordingly communication can become active.

Next, the layout part 22 preferably generates meta data which is the deciding factor for what layout in a similar manner in the first and second embodiments. This is done to perform the layout process, that is, the process for writing a text into moving images.

FIG. 13 is a diagram showing exemplary Description of meta data about such a layout process. Description of FIG. 13 is, similar to the first and second embodiments, in MPEG-7 format. Based on a value of "MediaDuration", that is, the length indicated by a predetermined point of the media, any sentence between "Text" tags is superimposed for display. As such, with Description of meta data, text display is enabled without the process for embedding text in moving images.

(Fourth Embodiment)

With a media editing device of a fourth embodiment, message representation can be varied in style to extend the user's range of choices for his/her fun, facilitating smooth communication. This is achieved by the region extraction part 17 extracting a face region, and selecting a character image corresponding thereto.

Figure 14:
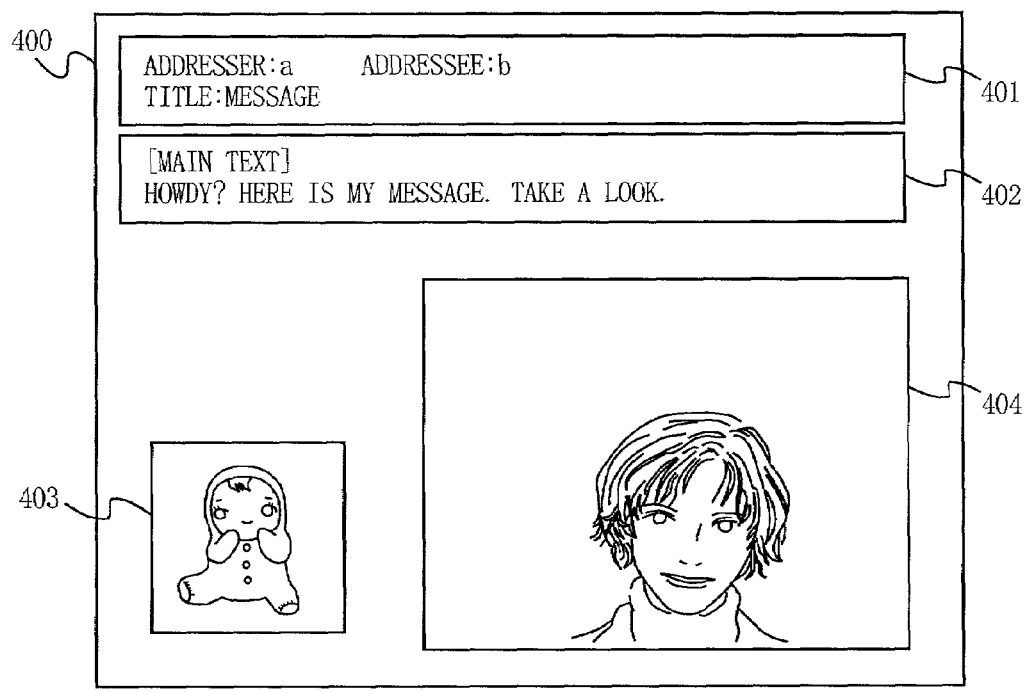
FIG. 14 shows an exemplary display image of a videomail on the receiver end having a character added.

Described first is an assumable case in the present embodiment. As already described, decorating videomails increases fun. As in the customizable photo sticker machines commonly seen in video game parlors or the like, attaching characters represented by cartoon sketches or three dimensional (3D) graphics to the user's image effectively makes the resultant videomail full of fun, and the receiver feels a closeness thereto. FIG. 14 shows an exemplary display image of a videomail on the receiver end having such a character added. As shown in FIG. 14, displayed on a display image 400 are a header section 401 indicating who has sent the videomail to whom with what title, a text section 402, a moving image section 404, and a character section 403. With such a layout of videomail on the display screen, the receiver can feel a closeness thereto to a further degree.

At the time of character selection, the user may have an itch to select a character relevant to moving images or details thereof. In the case that the display image is a face image, the present media editing device selects a character corresponding thereto in the layout process. In the below, the resultant mail with a character added is referred to as a "character mail".

FIG. 15 is a block diagram showing the functional structure of the media editing device of the fourth embodiment. In FIG. 15, the present media editing device includes the moving image data storage part 14, the transmission data storage part 15, the region extraction part 17, the front determination part 18, an editing part 26, a character selection part 24, and a character database 25. These constituents carry out the layout process of FIG. 2 partially or entirely.

Note that, this media editing device is the same in structure and operation as that of the first embodiment, and thus any identical constituent is under the same reference numeral, and not described again. In the present embodiment, sound data is not necessarily required. Therefore, stored in the moving image data storage part 14 may be moving image data similar to that in the first embodiment, or image data carrying no sound. For the clipping process aforementioned in the first embodiment, any corresponding constituent of FIG. 3 may be added. Therefore, no further description is provided here. Moreover, as already described, the front determination part 18 may be the designated face orientation determination part.

Described next is the operation of the media editing device of the present embodiment. The region extraction part 17 and the front determination part 18 operate in a similar manner to the first embodiment, and determine whether or not the user in the moving images is facing the front. The result is forwarded to the editing part 26, from which any image determined as being the front image is provided to the character selection part 24. Based on thus received image(s), the character selection part 24 selects one or more of potential characters from the character database 25, where various characters are stored as a database. Then, a character ID each corresponding to the thus selected character(s) are inputted into the editing part 26.

Here, in the present embodiment, a characteristic of the face in the front image is extracted so that one or more of various many characters stored in the character database 25 can be selected.

That is, in the character database 25, character information has been previously registered. Here, the character information includes character images (e.g., two-dimensional (2D) character image data, data representing 3D characters generated by computer graphics), and a face characteristic and a character ID each corresponding to the character images. By referring to the face characteristic in the front image provided by the editing part 26, the character selection part 24 selects from the character database 25 one or more of the character images having the identical or analogous face characteristic thereto. Here, the face characteristic is exemplary of the size, the length-to-width ratio, and the partial characteristic, all of which are represented by value. Further, the partial characteristic is exemplary of the size of the eyes, the nose, or the mouth, the positional relationship thereamong, and the amount or color of the hair, all of which are also represented by value. The presence or absence of glasses may be also a possibility as the face characteristic.

Described below is about the face characteristic in more detail. FIG. 16 is a diagram exemplarily showing face characteristic values specifically focusing on the hair. FIG. 16 shows six images of each different user, and each corresponding thereto, processing results and characteristic representations. Here, although the users' images are usually picture images, shown in FIG. 16 are their portraits for easy view. Moreover, the face characteristic is not limited to the characteristic values and the characteristic representations, and either one of those, or any other value or representation will do.

In FIG. 16, on the presumption that the hair is black, the users' images are subjected to processing of extracting any black region therefrom, and the results are the processing results. This is not surely restrictive, and no matter what color the hair is, the processing can be similarly carried out by extracting any region in the corresponding color. Here, the characteristic values are exemplified by the normalized area and circumference. The normalized area is a value obtained by normalizing the hair area by the face area. The normalized circumference is a value obtained by normalizing the circumference of the hair area by that of the face area. As for the characteristic expressions, exemplified are the amount of hair and the hair style. The amount of hair is roughly represented in two categories based on the average amount of hair. To be specific, if the normalized area shows a smaller value than the average, the user's hair is considered large in amount, and with a larger value, the amount of hair is considered small. Similarly, the hair style is also roughly represented in two categories based on the general hair style. To be specific, if the normalized circumference shows a smaller value than the average, the user's hair style is considered short, and with a larger value, the hair style is considered long. As such, by using thus extracted face characteristic values or the characteristic representations thereof, one or more of any analogous character images can be selected from the character database 25.

There have been various methods for extracting such face characteristic values. As one example, there is a method described in "Smartface"—A Robust Face Recognition System under Varying Facial Pose and Expression (Publication of The Electronic Information Communications Society, Vol. J84-D-II, No. 6). In detail, in the method, a face region is first detected under the subspace method, and then the face parts (e.g., eyes, nose, mouth) are detected by using a separation filter. In the present media editing device, by applying at least one of such various known methods, the face characteristic values can be extracted in an easy manner.

In order to select any potential character registered in the character database 25 with reference to the extracted face characteristic values, used may be the aforementioned characteristic representations, or correlation values calculated with respect to the registered face characteristic values. Here, if the correlation value exceeds a threshold value set for the potential character images considered suitable, the corresponding character image is extracted as a potential. The character selection part 24 then notifies the character ID corresponding to the thus extracted potential character to the editing part 26.

Figure 17:
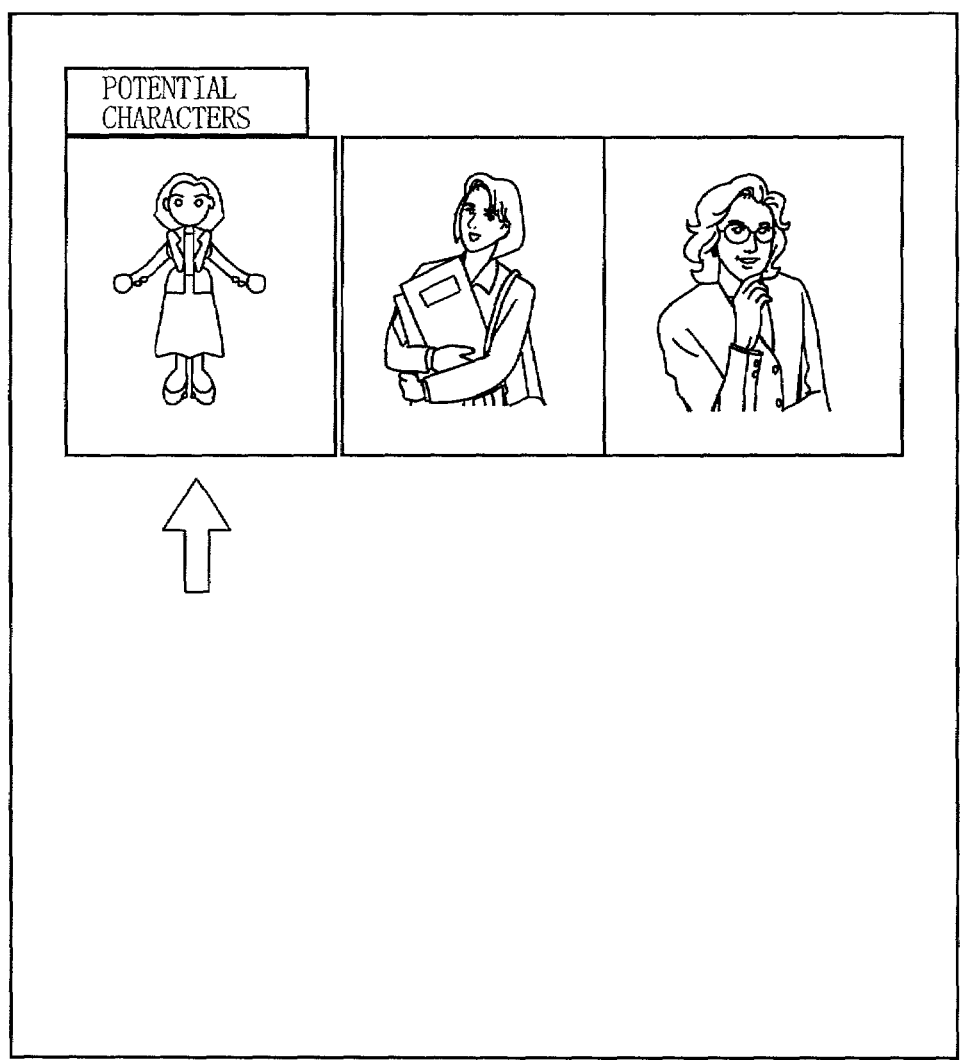
FIG. 17 is a diagram showing an exemplary editing screen for selecting which character to use.

Based on the notified character ID, the editing part 26 displays the character image selected as the potential to the user. FIG. 17 is a diagram showing an exemplary editing screen for selecting which character to use. FIG. 17 shows three potential characters, and an arrow therein is a cursor indicating which character the user is going to select. Here, using the cursor is not restrictive, and the character images may be sequentially inverted for selection, or enclosed by the thicker lines.

On such an editing screen shown in FIG. 17, the user selects which character to use. The editing part 26 performs media editing for generating the meta data having the selected character ID described so as to generate transmission data. Here, the character image itself may be combined into the transmission data. The resultant transmission data is stored in the transmission data storage 15, and transmitted with a timing considered appropriate to the data addressee.

Figure 18:
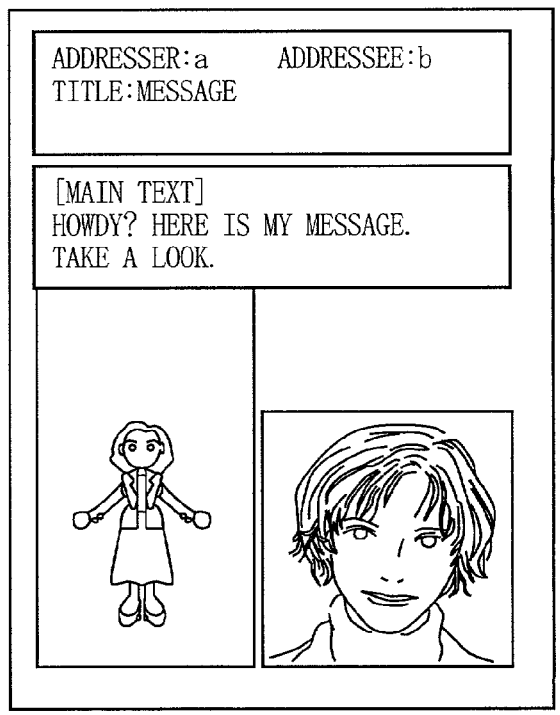
FIG. 18 is a diagram showing an exemplary screen on the receiver end receiving a character mail.

FIG. 18 is a diagram showing an exemplary screen on the receiver end receiving the transmission data generated as such. As shown in FIG. 18, in the lower left of the screen, displayed is a character selected by the user (addresser), and in the lower right, a message in the form of moving images is displayed.

Figure 19:
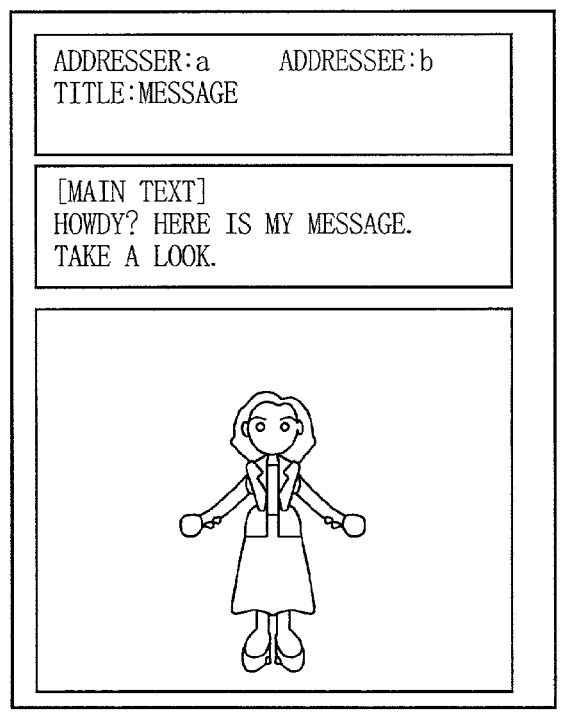
FIG. 19 is a diagram showing another exemplary screen on the receiver end receiving a character mail.

FIG. 19 is a diagram showing another exemplary screen on the receiver end receiving the transmission data. As shown in FIG. 19, displayed in the lower part of the screen is a character selected by the user (addresser). Here, when the message in the form of moving images is reproduced, the character may not be displayed, and in the meantime, the moving images may take over its display position. Such a layout may be generated by the editing part 26, or set on the receiver end.

Here, the number of potential characters to be selected may be one, and if this is the case, mail creation becomes easier without selecting any potential character.

The editing part 26 may notify a character string which indicates the characteristic values (or characteristic representations) inputted by the user. As an example, the user may input a character string of "the amount of hair is large, and the hair style short". In response, the character selection part 24 then refers to such characteristic representations as shown in FIG. 16 for comparison, and selects a potential character. As such, with the help of a character string indicating the characteristic values, the potential character selected by the present media editing device can be closely analogous to the user's intended character.

Figure 20:
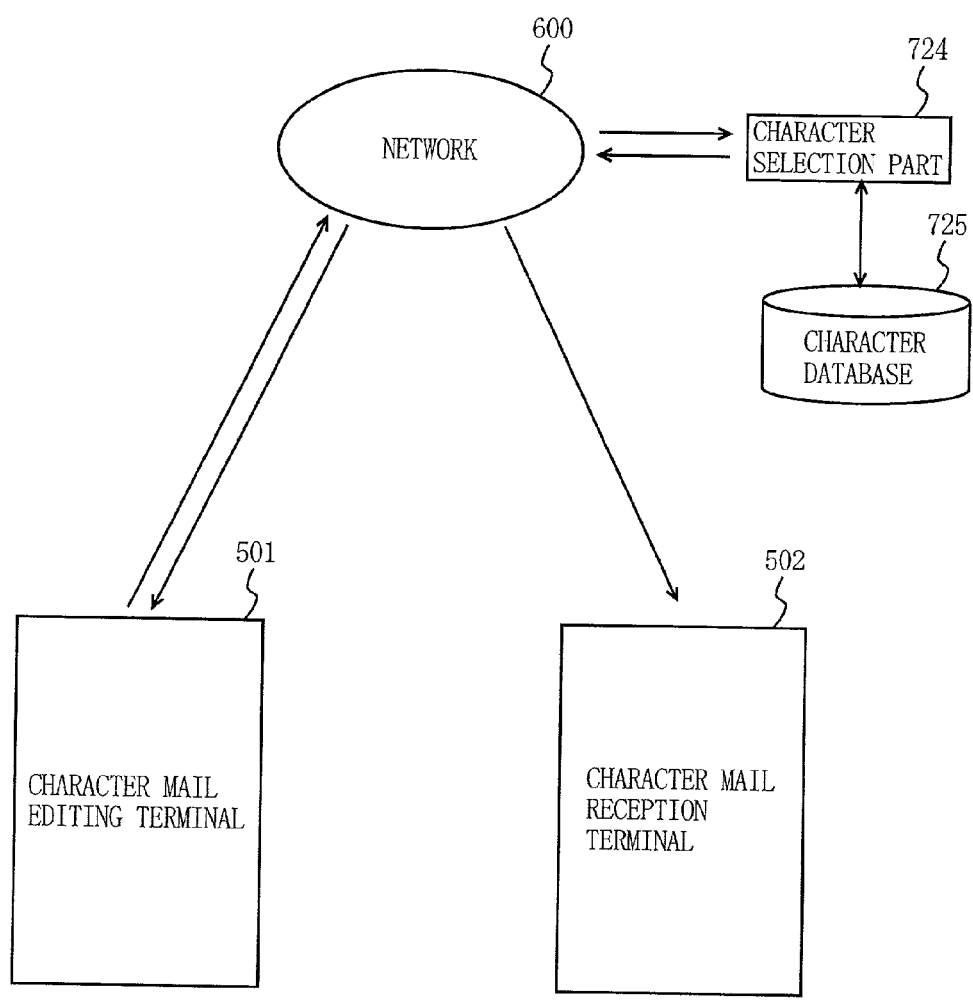
FIG. 20 is a block diagram showing the structure of a distributed-type media editing device (system).

Further, as already described, the present media editing device is not limited to be of an integrated-type including every constituent in one housing, but may be of a distributed-type where each constituent performs data exchange over the network or communications lines. If this is the case, the character selection part 24 and the character database 25 may be located separately from the media editing device, and be accessible over the network. FIG. 20 is a block diagram showing the structure of such a distributed-type media editing device (system).

In FIG. 20, such a distributed-type media editing device includes a character mail editing terminal 501, a character selection part 724, and a character database 725, which are interconnected over a network 600. Here, the character mail editing terminal 501 has the functions, partially or entirely, of the media editing devices of the first to third embodiments, and the character selection part 724 is located separately therefrom. Since this distributed-type media editing device is similar in structure and operation to the integrated-type, the same effects are to be achieved. Further, in the distributed-type media editing device of FIG. 20, in addition to the character mail editing terminal 501, the character selection part 724 and the character database 725 may be used also by a character mail reception terminal 502, or the like, where incoming mails are received and edited. If so, when receiving a character ID in a character mail, the character mail reception terminal 502 only needs to receive the corresponding character image from the character database 725. In such a structure, terminals do not have to carry data large in amount. Moreover, in the case that the character mail reception terminal 502 operates as the media editing device when returning mails, the character selection part 724 and the character database 725 can be shared.

As such, in the distributed-type media editing device, the character selection part 724 and the character database 725 can be shared by a plurality of users. Therefore, terminals have no need to include those constituents, and can use databases storing various characters.

As is known from the above, in the present media editing device, the user can easily create a character mail with any preferred character added thereto by narrowing down various characters based on front images extracted from moving images. Further, with such a character mail, person-to-person communication can be smooth and active.

While the invention has been described in detail, the foregoing description is in all aspects illustrative and not restrictive. It is understood that numerous other modifications and variations can be devised without departing from the scope of the invention.

What is claimed is:

1. A media editing method for editing media including an image sequence comprising a plurality of images showing a user partially or entirely as a subject, said media editing method comprising:
   extracting a region from the images partially or entirely including the user;
   determining whether or not the user included in the region extracted in said extracting operation is facing a predesignated direction;
   selecting a part of the image sequence between time points determined as being when the user is facing the predesignated direction in said determining operation by scanning the image sequence from a start point to an end point, and from the end point to the start point; and
   editing the media including the part of the image sequence selected in said selecting operation.

2. The media editing method according to claim 1, wherein said determining operation comprises determining whether or not the user included in the region extracted in said extracting operation is facing frontwards.

3. The media editing method according to claim 1, further comprising detecting a sound included in the media, wherein
   said selecting operation comprises selecting, by scanning the image sequence from the start point to the end point, and from the end point to the start point, the part of the image sequence between the time points determined in said determining operation as being when the user is facing the predesignated direction, and between time points at which the sound is detected.

4. The media editing method according to claim 1, wherein said editing operation comprises specifying the part of the image sequence selected in said selecting operation by a description in a meta-deta format.

5. The media editing method according to claim 1, wherein said editing operation comprises clipping out the part of the image sequence selected in said selecting operation from the media.

6. The media editing method according to claim 1, wherein said editing operation comprises selecting a first image in the part of the image sequence selected in said selectingstep operation as an initial display image.

7. The media editing method according to claim 1, wherein said editing operation comprises calculating a partial region corresponding to the image sequence based on a position and a size of the region extracted in said extracting operation, and performing editing by using the partial region.

8. The media editing method according to claim 7, wherein said editing operation further comprises specifying the partial region by a description in a meta data format.

9. The media editing method according to claim 1, wherein said editing a operation comprises arranging text included in the media onto an arrangement region which is so set as not to overlap or overlap as little as possible the region extracted in said extracting operation.

10. The media editing method according to claim 1, wherein
    said extracting operation comprises extracting a face region including a face of the user, and
    said editing operation comprises arranging text included in the media onto a speech bubble region which is so set as not to overlap or overlap as little as possible the region extracted in said extracting operation.

11. The media editing method according to claim 1, wherein said editing operation comprises performing an image conversion process for one or more of the images.

12. The media editing method according to claim 1, wherein
    said extracting operation comprises extracting a face region including a face of the user, and
    said editing operation comprises referring to a face characteristic calculated based on the face region extracted in said extracting operation, and from a character database storing a plurality of character images and face characteristics corresponding thereto, selecting one or more of the character images.

13. The media editing method according to claim 12, wherein said editing operation comprises calculating the face characteristic based on character data inputted by the user.

14. The media editing method according to claim 12, wherein said editing operation comprises calculating the face characteristic based on a length-to-width ratio or a partial characteristic of a face in the face region extracted in said extracting operation.

15. A media editing device for editing media including an image sequence comprising a plurality of images showing a user partially or entirely as a subject, said media editing device comprising:
    a region extraction part for extracting a region from the images partially or entirely including the user;
    a predesignated face orientation determination part for determining whether or not the user included in the region extracted by said region extraction part is facing a predesignated direction;
    a frame selection part for selecting a part of the image sequence between time points determined as being when the user is facing the predesignated direction by said predesignated face orientation determination part by scanning the image sequence from a start point to an end point, and from the end point to the start point; and
    an editing part for editing the media including the image sequence selected by said frame selection part.

16. The media editing device according to claim 15, further comprising a sound detection part for detecting a sound included in the media, wherein
    said frame selection part selects, by scanning the image sequence from the start point to the end point, and from the end point to the start point, the part of the image sequence between the time points determined by said predesignated face orientation determination part as being when the user is facing the predesignated direction, and between time points at which the sound is detected.

17. The media editing device according to claim 15, wherein said editing part selects a first image in the part of the image sequence selected by said frame selection part as an initial display image.

18. The media editing device according to claim 15, wherein said editing part calculates a partial region corresponding to the image sequence based on a position and a size of the region extracted by said region extraction part, and performs editing by using the partial region.

19. The media editing device according to claim 15, wherein said editing part arranges text included in the media onto an arrangement region which is so set as not to overlap or overlap as little as possible the region extracted by said region extraction part.

20. The media editing device according to claim 15, wherein
   said region extraction part extracts a face region including a face of the user, and
   said editing part refers to a face characteristic calculated based on the face region extracted by said region extraction part, and from a character database storing a plurality of character images and face characteristics corresponding thereto, selects one or more of the character images.

21. A program recorded on a computer-readable recording medium to be carried out by a device for editing media including an image sequence comprising a plurality of images showing a user partially or entirely as a subject, said program comprising:
   extracting a region from the images partially or entirely including the user;
   determining whether or not the user included in the region extracted in said extracting operation is facing a predesignated direction;
   selecting a part of the image sequence between time points determined as being when the user is facing the predesignated direction in said determining operation by scanning the image sequence from a start point to an end point, and from the end point to the start point; and
   editing the media including the image sequence selected in said selecting operation.

* * * * *

UNITED STATES PATENT AND TRADEMARK OFFICE
CERTIFICATE OF CORRECTION

PATENT NO. : 6,961,446 B2 Page 1 of 1
DATED : November 1, 2005
INVENTOR(S) : Kazuyuki Imagawa et al.

It is certified that error appears in the above-identified patent and that said Letters Patent is hereby corrected as shown below:

<u>Title page,</u>
Item [56], References Cited, FOREIGN PATENT DOCUMENTS, correct the first reference to read as follows:
-- JP          5-161131          6/1993 --.
Item [57], ABSTRACT,
Line 14, replace "on thus" with -- on the thus --.

<u>Column 19,</u>
Line 56, replace "selectingstep" with -- selecting --.

Signed and Sealed this

Twenty-first Day of March, 2006

JON W. DUDAS
*Director of the United States Patent and Trademark Office*